US012609446B2

(12) United States Patent
Su et al.

(10) Patent No.: US 12,609,446 B2
(45) Date of Patent: Apr. 21, 2026

(54) ANTENNA PHASE CONTROL METHOD AND DEVICE

(71) Applicant: Chiun Mai Communication Systems, Inc., New Taipei (TW)

(72) Inventors: Chia-Hung Su, New Taipei (TW); Lung-Ta Chang, New Taipei (TW); Chang-Ching Huang, New Taipei (TW); Shu-Wei Jhang, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 321 days.

(21) Appl. No.: 18/204,937

(22) Filed: Jun. 1, 2023

(65) Prior Publication Data

US 2024/0039153 A1 Feb. 1, 2024

(30) Foreign Application Priority Data

Jul. 29, 2022 (CN) .......................... 202210911028.5

(51) Int. Cl.
*H01Q 3/30* (2006.01)
*G01S 19/24* (2010.01)
*H01Q 1/32* (2006.01)

(52) U.S. Cl.
CPC .............. *H01Q 3/30* (2013.01); *G01S 19/24* (2013.01); *H01Q 1/32* (2013.01)

(58) Field of Classification Search
CPC .......... H01Q 3/30; H01Q 1/32; H01Q 1/3275; H01Q 1/3233; G01S 19/24; G01S 19/14; G01S 19/36
See application file for complete search history.

(56) References Cited

U.S. PATENT DOCUMENTS

| | | | |
|---|---|---|---|
| 6,377,211 | B1 | 4/2002 | Hsiung |
| 9,008,940 | B2 * | 4/2015 | Ueyama ................. G08G 1/165 |
| | | | 701/1 |
| 2020/0124698 | A1 * | 4/2020 | Noujeim ............... G01S 13/931 |
| 2021/0249767 | A1 * | 8/2021 | Greenwood ......... H01Q 21/061 |

FOREIGN PATENT DOCUMENTS

| | | | | |
|---|---|---|---|---|
| CN | 106025551 | A | 10/2016 | |
| CN | 106785442 | A | 5/2017 | |
| CN | 112130568 | A | 12/2020 | |
| CN | 112467379 | A | 3/2021 | |
| DE | 102019112732 | A1 * | 1/2020 | ......... B60R 16/0231 |

* cited by examiner

*Primary Examiner* — Robert W Hodge
*Assistant Examiner* — Bongani Jabulani Mashele
(74) *Attorney, Agent, or Firm* — ScienBiziP, P.C.

(57) ABSTRACT

An antenna phase control method is applied to an antenna phase control device and an antenna, the antenna disposed on a moving carrier. The method includes obtaining a location information of the moving carrier; obtaining a destination information of the moving carrier and generating a navigation information according to the location information and the destination information; calculating at least one preset location point in the path and a phase information of the antenna corresponding to the at least one preset location point; and controlling a phase of the antenna according to the phase information when the moving carrier reaches the at least one preset location point. The present disclosure also provides an antenna phase control device.

14 Claims, 9 Drawing Sheets

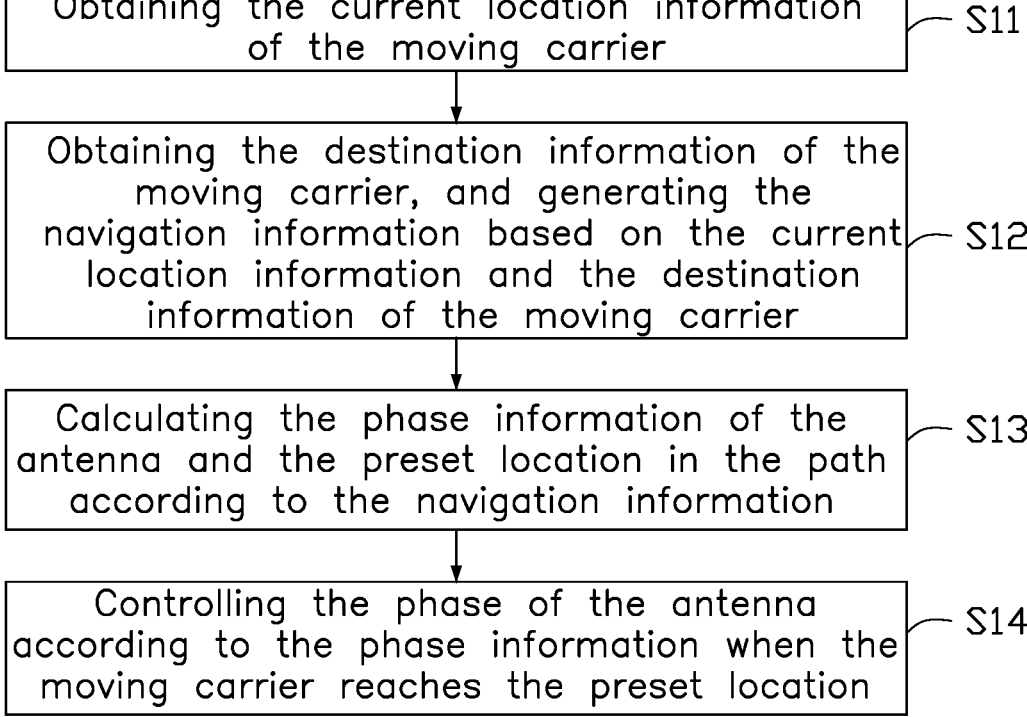

Obtaining the current location information of the moving carrier — S11

Obtaining the destination information of the moving carrier, and generating the navigation information based on the current location information and the destination information of the moving carrier — S12

Calculating the phase information of the antenna and the preset location in the path according to the navigation information — S13

Controlling the phase of the antenna according to the phase information when the moving carrier reaches the preset location — S14

FIG. 8

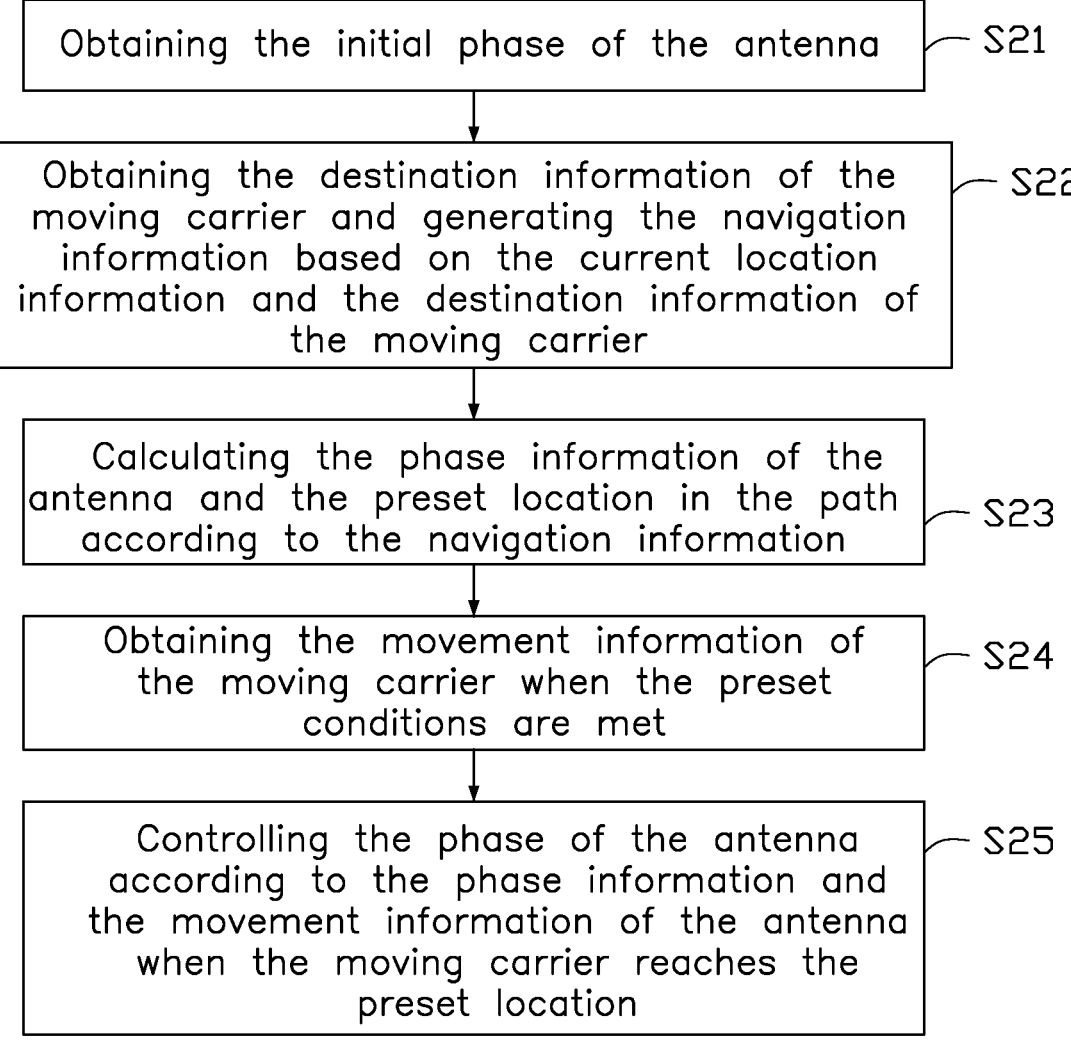

Obtaining the initial phase of the antenna — S21

Obtaining the destination information of the moving carrier and generating the navigation information based on the current location information and the destination information of the moving carrier — S22

Calculating the phase information of the antenna and the preset location in the path according to the navigation information — S23

Obtaining the movement information of the moving carrier when the preset conditions are met — S24

Controlling the phase of the antenna according to the phase information and the movement information of the antenna when the moving carrier reaches the preset location — S25

FIG. 9

ANTENNA PHASE CONTROL METHOD AND DEVICE

CROSS-REFERENCE TO RELATED APPLICATIONS

The present application claims the benefit of and priority to Chinese patent application NO. 202210911028.5, field on Jul. 29, 2022, the entirety of which is incorporated herein by reference.

FIELD

The present disclosure relates to the antenna field, in particular to an antenna phase control method and device.

BACKGROUND

With the development of satellite communication technology, the vehicle-mounted antenna has been more widely used, the vehicle can communicate with the low earth orbit (LEO) communication satellite through the vehicle-mounted antenna to access the network without the connection of the base station. The LEO satellite communication system is a highly directional communication system, when the vehicle-mounted antenna communicates with the LEO communication satellite, in order to maintain communication, the vehicle-mounted antenna and the LEO satellite need to maintain the docking of antenna beam azimuth angle. When the vehicle is driving, turning, going up and down, or even bumping the road surface will cause the antenna beam azimuth angle to shift instantaneously, affecting the communication quality between the vehicle and the LEO satellite.

Therefore, improvement is desired.

BRIEF DESCRIPTION OF THE DRAWINGS

Implementations of the present disclosure will now be described, by way of embodiments, with reference to the attached figures.

FIG. 8 is a flowchart of an embodiment of the antenna phase control method of the present disclosure.

FIG. 9 is a flowchart of another embodiment of the antenna phase control method of the present disclosure.

DETAILED DESCRIPTION

In the embodiment of the present disclosure, the words "first" and "second" are only used to distinguish different objects and cannot be understood as indicating or implying relative importance, or as indicating or implying order. For example, the first application and the second application are used to distinguish different applications, not to describe the specific order of applications.

Figure 1:
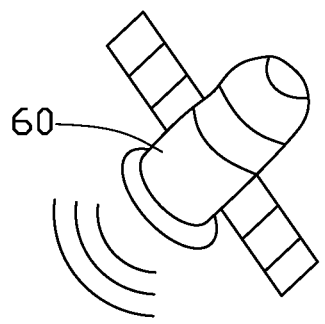
FIG. 1 is a schematic diagram of an embodiment of a communication system of the present disclosure.
Figure 1:
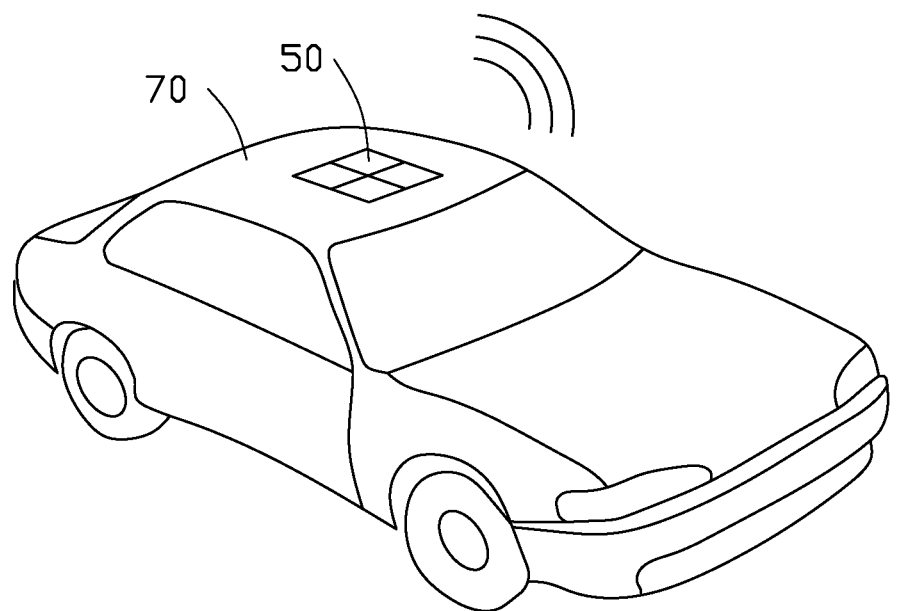

FIG. 1 illustrates a communication system 1 in accordance with an embodiment of the present disclosure.

The communication system 1 includes a satellite 60 and a moving carrier 70. In some embodiments, the moving carrier 70 can be vehicle, ship, etc. The moving carrier 70 is equipped with an antenna 50, the antenna 50 is used to communicate with the satellite 60. In one embodiment, the satellite 60 may be a low earth orbit (LEO) satellite.

It can be understood that the antenna 50 can be an array antenna. In some embodiments, the antenna 50 may be a phased array antenna. The antenna 50 may include a plurality of antenna elements. It can be understood that the communication quality of the antenna 50 and the satellite 60 is associated with the signal radiation direction of the antenna 50, the signal radiation direction of the antenna 50 is associated with the signal radiation direction of each antenna element, and the signal radiation direction of each antenna element is associated with the phase value of each antenna element. Therefore, the present disclosure can control the signal radiation direction of the antenna 50 by controlling the phase of each the antenna element of the antenna 50, thereby improving the communication quality between the antenna 50 and the satellite 60.

Figure 2A:
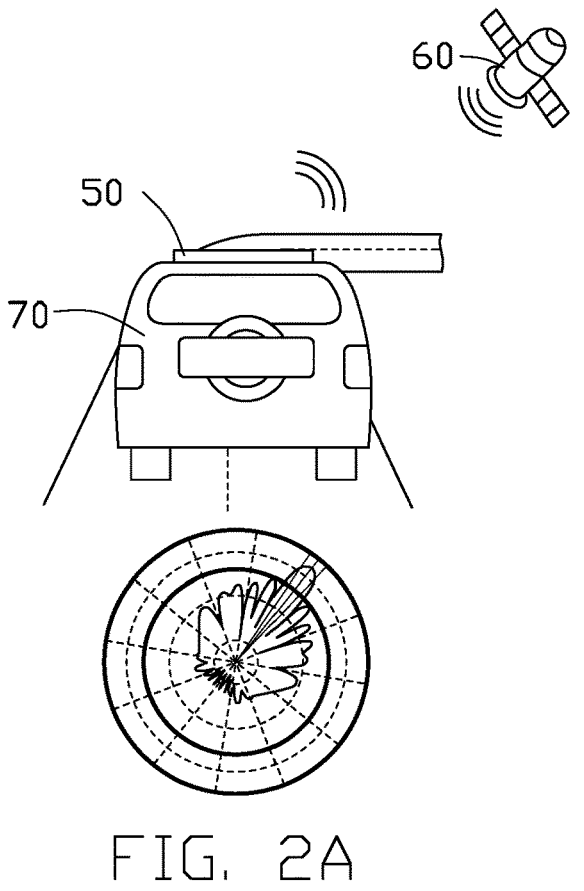
FIG. 2A and FIG. 2B are schematic diagrams of antenna radiation direction of a moving carrier in motion.
Figure 2B:
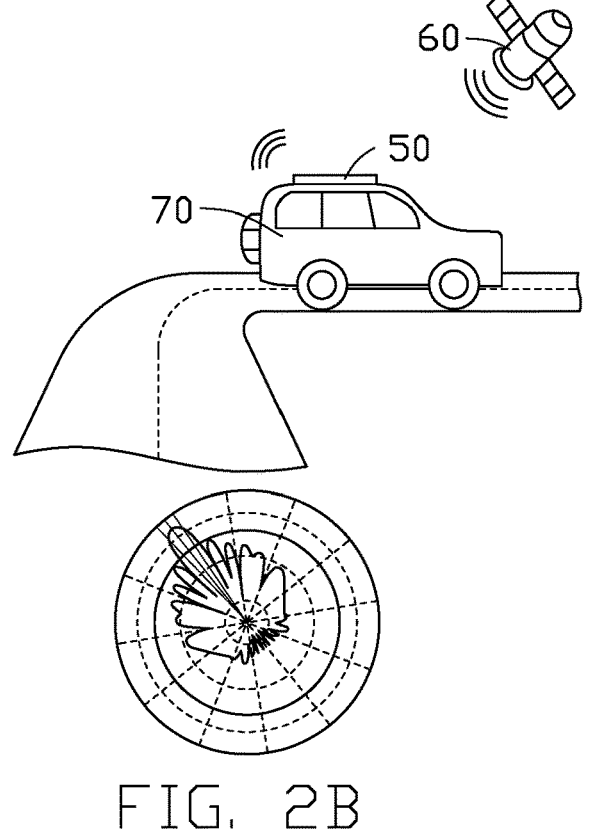

FIGS. 2A and 2B show the signal radiation direction of the antenna 50 when the moving carrier 70 is moving. when the moving carrier 70 is moving in a straight line (for example, the vehicle is moving in a straight line) or stationary, the signal radiation direction of the antenna 50 is a first direction, the first direction corresponds to the signal radiation direction of the satellite 60, and the communication quality between the antenna 50 and the satellite 60 is better. When the moving carrier 70 changes direction (for example, the vehicle turns), the signal radiation direction of the antenna 50 becomes a second direction, the second direction does not correspond to the signal radiation direction of the satellite 60, and the communication quality between the antenna 50 and the satellite 60 will degrade significantly.

Figure 3:
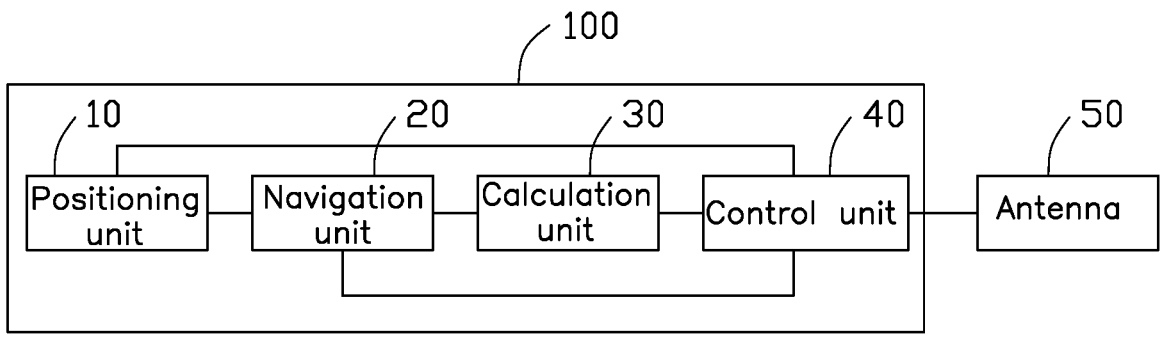
FIG. 3 is a schematic diagram of an embodiment of an antenna phase control device of the present disclosure.

FIG. 3 illustrates an antenna phase control device 100 in accordance with an embodiment of the present disclosure.

The antenna phase control device 100 is disposed on the moving carrier 70. The antenna phase control device 100 is electrically connected to the antenna 50, and the antenna phase control device 100 is used to control the signal radiation direction of the antenna 50. For example, the antenna phase control device 100 can control the phase value of the antenna 50 to control the signal radiation direction of the antenna 50.

The antenna phase control device 100 includes a positioning unit 10, a navigation unit 20, a calculation unit 30 and a control unit 40. The positioning unit 10 is electrically connected to the navigation unit 20 and the control unit 40, the navigation unit 20 is electrically connected to the calculation unit 30, the calculation unit 30 is electrically connected to the control unit 40, and the control unit 40 is electrically connected to the antenna 50.

The positioning unit 10 is used to obtain the current location information of the moving carrier 70. For example, the positioning unit 10 can position the moving carrier 70 through the Global Positioning System (GPS), Global Navigation Satellite System (GLONASS), BeiDou Navigation Satellite System (BDS), and obtain the current location information of the moving carrier 70. In some embodiments, the current location information includes the longitude, the latitude and the altitude of the moving carrier 70.

The navigation unit 20 is used to obtain the destination information of the moving carrier 70 and generate the navigation information based on the current location information and the destination information of the moving carrier 70. The user can input the destination of the moving carrier 70 to the navigation unit 20 through an on-board computer, and the navigation unit 20 can query the destination information (such as the longitude, the latitude and the altitude of the destination location), thereby calculating the navigation information. The navigation information includes the path from the current location of the moving carrier 70 to the destination, as well as the direction information and the slope information of the location points on the path. For example, the navigation unit 20 may be a vehicle navigation instrument, a vehicle navigation computer, etc.

The calculation unit 30 is used to calculate the phase information of the antenna 50 based on the navigation information. The calculation unit 30 may preload the path in the navigation information to extract a plurality of the location points on the path. It is understood that the sampling frequency and the sampling preference location can be preset. The calculation unit 30 can extract the location information (such as the longitude, the latitude, the altitude value of the location points) of the plurality of the location points, the direction information (such as the direction and the angle value) of the plurality of the location points and the slope information of the plurality of the location points from the navigation information. The calculation unit 30 can calculate the phase information of the antenna 50 according to the direction information and the slope information of the plurality of the location points, to adjust the signal radiation direction of the antenna 50. In some embodiments, the calculation unit 30 can be a Micro Controller Unit (MCU) or a Central Processing Unit (CPU), etc.

In some embodiments, the calculation unit 30 can select a first location point and a second location point from the plurality of the location points, optionally, the first location point is adjacent to the second location point in the path. The calculation unit 30 can calculate the direction and the slope information of the first location point and the direction and the slope information of the second location point. If the change of the direction or the slope information of the first location point and the second location point is greater than a threshold value, and the calculation unit 30 may take the first location point and/or the second location point as the preset location point. The preset location point is the location where the change of the direction or the slope information is greater than the threshold value. Optionally, the calculation unit 30 may apply a location point close to the destination as the preset location point. For example, if the direction information of the first location point is 20° northeast, the direction information of the second location point is 10° northeast, and the threshold value is 5°, and the second location point is close to the destination, the calculation unit 30 can determine the second location point as the preset location.

The control unit 40 is used to control the phase value of the antenna 50 according to the phase information of the antenna 50 to adjust the signal radiation direction of the antenna 50 when the moving carrier 70 reaches the preset location. The control unit 40 can obtain the current location information of the moving carrier 70 from the positioning unit 10 and receive the phase information and the preset location information output by the calculation unit 30. When the control unit 40 detects that the current location of the moving carrier 70 is the preset location, the control unit 40 can adjust the phase of the antenna 50 according to the phase information to adjust the signal radiation direction of the antenna 50 and improve the communication quality between the antenna 50 and the satellite 60. In some embodiments, the control unit 40 may be a phase shifter, a mechanical controller (such as a rotary motor).

Figure 4:
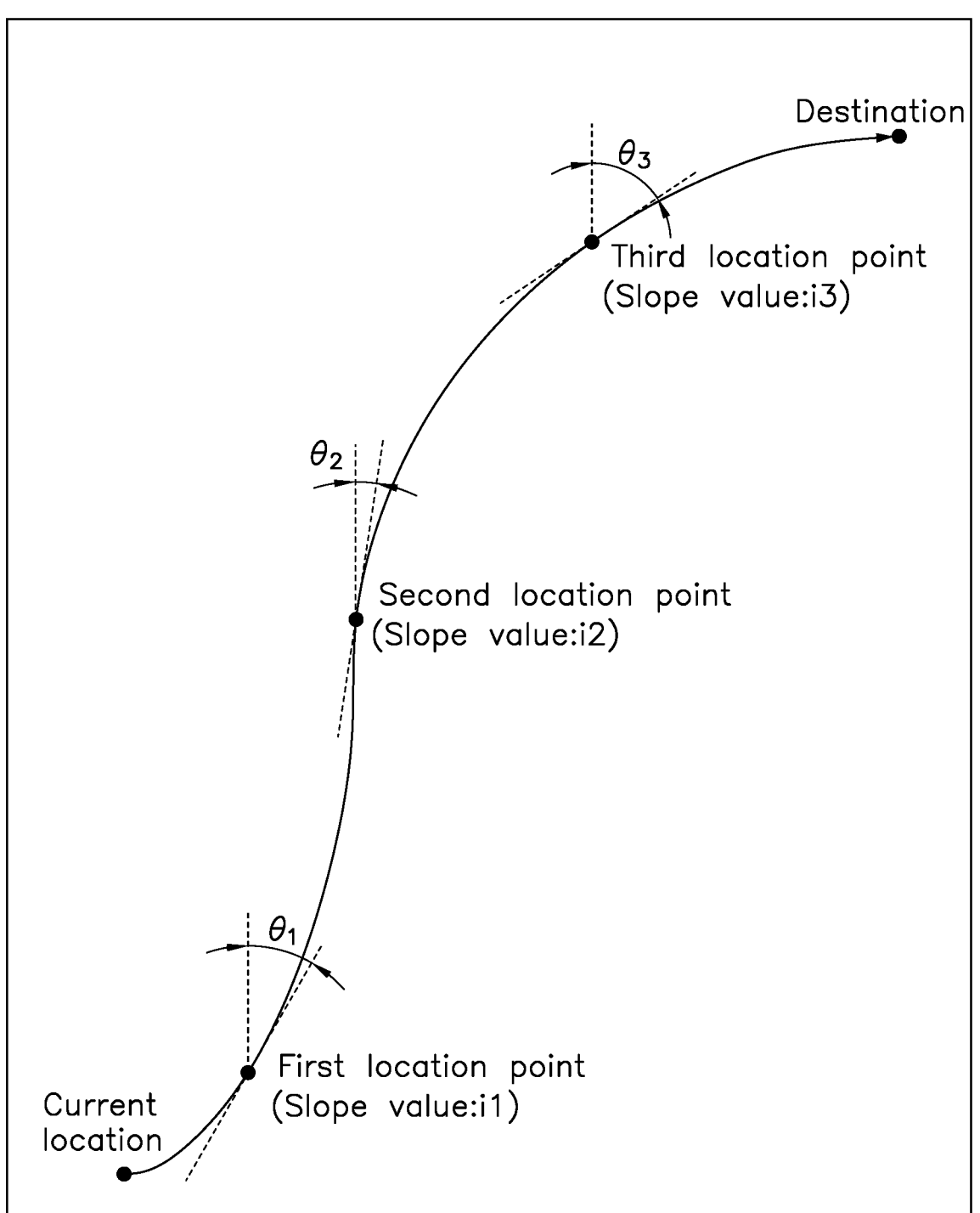
FIG. 4 is a schematic diagram of the navigation information of the present disclosure.
Figure 5:
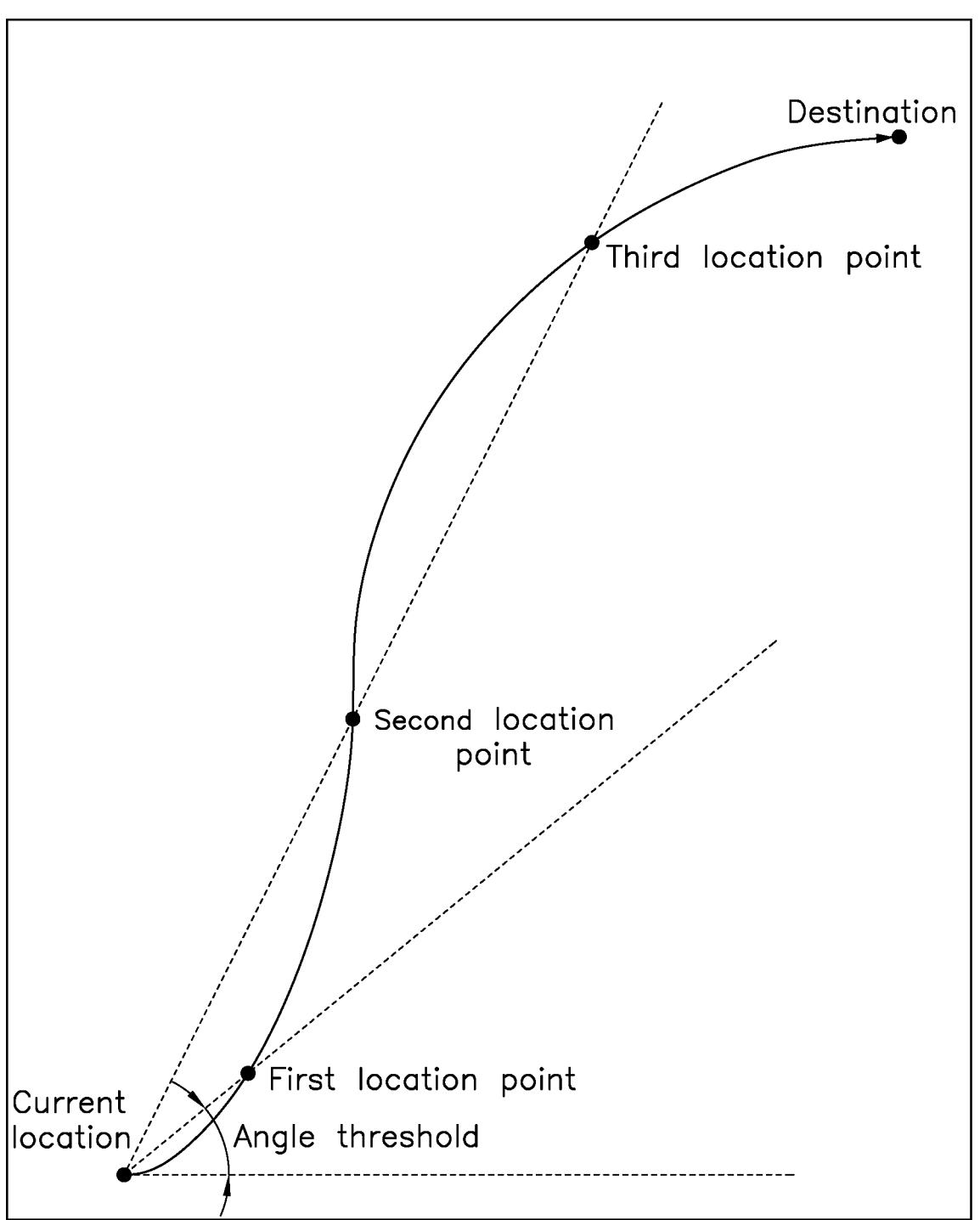
FIG. 5 is another schematic diagram of the navigation information of the present disclosure.

Referring to FIGS. 4 and 5, the navigation information includes the path from the current location to the destination, the location information (such as the longitude, the latitude, and the altitude value) of the location point in the path, the direction information (such as the direction and the angle value) and the slope information.

It can be understood that the calculation unit 30 can extract the plurality of the location points from the path of the navigation information after the navigation unit 20 generates the navigation information, for example, as shown in FIG. 4, the calculation unit 30 can extract the first location point, the second location point and the third location point equidistantly on the path, alternatively, as shown in FIG. 5, the calculation unit 30 can set an angle threshold to draw a circle with the current location as the center of the circle and the angle threshold as the center of the circle, and the plurality of the intersection points between the circle and the path are the plurality of the location points.

In the embodiment, the directions of the first location point, the second location point and the third location point are northeast. The direction angle of the first location point is $\theta 1$, the direction angle of the first location point is $\theta 2$, the direction angle of the third location point is $\theta 3$, the slope value of the first location point is $i1$, the slope value of the second location point is $i2$, and the slope value of the third location point is $i3$.

The calculation unit 30 can calculate the variation amount of the direction information between the first location point and the second location point, the variation amount of the direction information between the first location point, the third location point, and the variation amount of the direction information between the second location point, the third location point. For example, the calculation unit 30 can calculate the variation amount of the direction information between the first location point and the second location point as $|\theta 2 - \theta 1|$, when the variation amount of the direction information is greater than a first threshold value, the calculation unit 30 can take the second location point as the preset location. Similarly, when the variation amount of the direction information between the second location point and the third location point is greater than the first threshold value, the calculation unit 30 can select the third location point as the preset location and output the preset location to the control unit 40.

The calculation unit 30 can calculate the variation amount of the slope information between the first location point and the second location point, the variation amount of the slope information between the first location point, the third location point, and the variation amount of the slope information between the second location point, the third location point. For example, the calculation unit 30 can calculate the variation amount of the slope information between the first location point and the second location point as $|\theta 2 - \theta 1|$, when the variation amount of the slope information is greater than a second threshold value, the calculation unit 30 can take the second location point as the preset location. Similarly, when the variation amount of the slope information between the second location point and the third location point is greater than the second threshold value, the calculation unit 30 can select the third location point as the preset location and output the preset location to the control unit 40.

Figure 6:
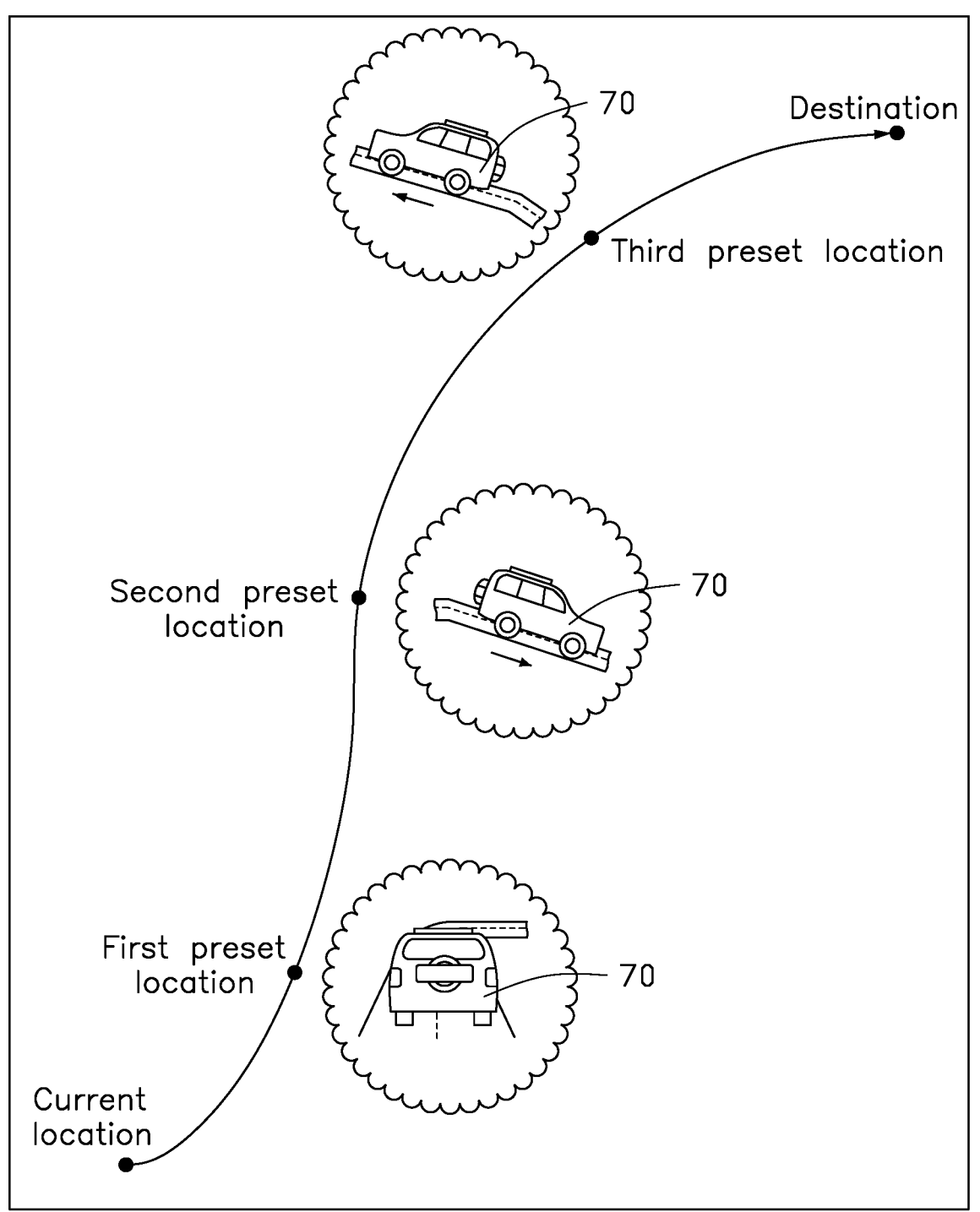
FIG. 6 is another schematic diagram of the navigation information of the present disclosure.

In some embodiments, the calculation unit 30 can obtain the turning location, the uphill or the downhill location in the path according to the navigation information and use it as a preset location. For example, the calculation unit 30 can set a turning angle threshold and a slope threshold, if the turning angle of the location point in the path is greater than the turning angle threshold or the slope of the location point is greater than the slope threshold, the location point will be used as the preset location. For example, as shown in FIG. 6, the calculation unit 30 extracts the first preset location, the second preset location and the third preset location from the path, the first preset location is the turning location in the path, the second preset location is the location where the downhill slope in the path is greater than the slope threshold, and the third preset location is the location where the uphill slope in the path is greater than the slope threshold.

Figure 7:
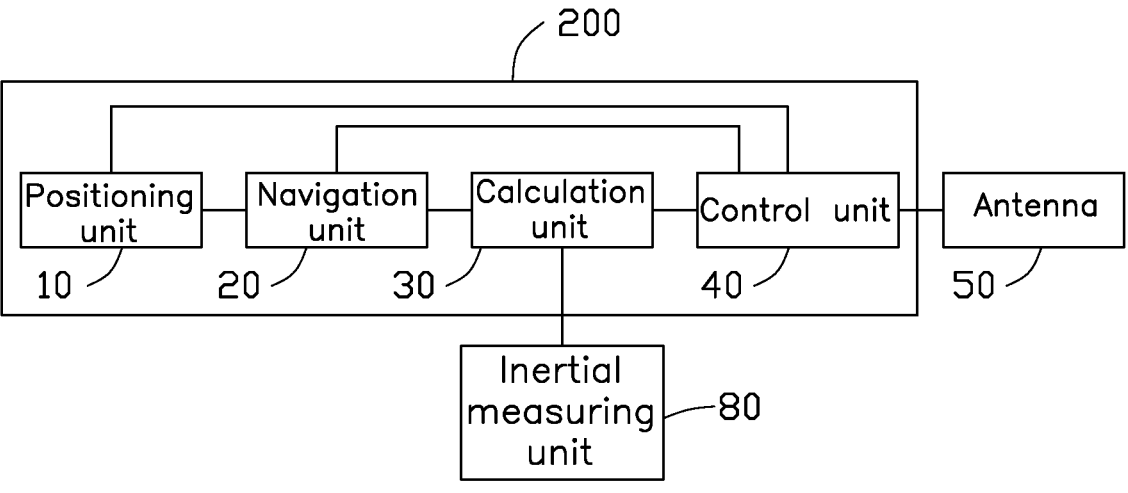
FIG. 7 is a schematic diagram of another embodiment of the antenna phase control device of the present disclosure.

FIG. 7 illustrates an antenna phase control device 200 in accordance with another embodiment of the present disclosure.

The difference between the antenna phase control device 200 provided by the embodiment and the antenna phase control device 100 in FIG. 3 is that: the antenna phase control device 200 further includes an inertial measuring unit 80. The inertial measuring unit 80 is electrically connected to the calculation unit 30, the inertial measuring unit 80 is used to obtain the current movement information of the moving carrier 70, the movement information includes the current direction information and the current angle information of the moving carrier 70.

In some embodiments, the inertial measuring unit 80 includes an accelerometer, a gyroscope and a magnetometer. The accelerometer is used to measure the current acceleration of the moving carrier 70 (including gravity acceleration), the gyroscope is used to measure the angular velocity and the direction angle of the moving carrier 70, and the magnetometer is used to measure the magnetic field strength and the direction at the location of the moving carrier 70.

It can be understood that the current movement information measured by the inertial measurement unit inertial measuring unit 80 is more accurate and can better reflect the real direction information of the moving carrier 70, and the calculation unit 30 can calculate the phase information of the antenna 50 based on the current movement information output by the inertial measuring unit 80.

In some embodiments, when the preset conditions are met, the inertial measuring unit 80 acquires the current movement information of the moving carrier 70. In one embodiment, the preset condition includes turning on a turn signal. In another embodiment, the preset condition includes turning on a steering wheel. For example, the preset conditions may include turning on a turn signal of the moving carrier 70, steering wheel rotation angle greater than the preset threshold. It can be understood that when the preset conditions are met, the movement direction of the moving carrier 70 will change significantly in a short time. Therefore, it is necessary to pre-calculate the phase information using the location to be reached and the direction to be changed by the moving carrier 70 in the next time. When the preset location is reached, the inertial measuring unit 80 measures accurate movement information for the calculation unit 30 to calculate the phase of the antenna 50.

FIG. 8 is a flowchart of the antenna phase control method in accordance with an embodiment of the present disclosure. The antenna phase control method can be executed by the antenna phase control device 100, and the method includes the following steps:

At step S11, obtaining the current location information of the moving carrier.

In some embodiments, the antenna phase control device 100 can position the moving carrier 70 through Global Positioning System (GPS), Global Navigation Satellite System (GLONASS), BeiDou Navigation Satellite System (BDS), and obtain the current location information of the moving carrier 70.

At step S12, obtaining the destination information of the moving carrier, and generating the navigation information based on the current location information and the destination information of the moving carrier.

The user can input the destination of the moving carrier 70 through the on-board computer, and the antenna phase control device 100 can query the destination information (such as the longitude, the latitude and the altitude of the destination location) according to the destination input by the user, thereby calculating the navigation information. The navigation information includes the path from the current location of the moving carrier 70 to the destination, the direction information and the slope information of the location points on the path.

At step S13, calculating the phase information of the antenna and the preset location in the path according to the navigation information.

In the embodiment, the antenna phase control device 100 can sample on the path of the navigation information to extract the plurality of the location points on the path. The antenna phase control device 100 can obtain the location information, the direction information and the slope information of the plurality of the location points from the navigation information, calculate the phase information of the antenna 50 according to the location information, the direction information and the slope information of the plurality of the location points, to adjust the signal radiation direction of the antenna 50.

In some embodiments, the antenna phase control device 100 can select the first location point and the second location point from the plurality of the location points, optionally, the first location point is adjacent to the second location point in the path. The antenna phase control device 100 can calculate the direction and the slope information of the first location point and the second location point. If the variation amount of the direction or the slope information of the first location point compared with the second location point is greater than the threshold value, the antenna phase control device 100 can take the first location point or the second location point as the preset location. Optionally, the antenna phase control device 100 can take a location point close to the destination as a preset location.

At step S14, controlling the phase of the antenna according to the phase information when the moving carrier reaches the preset location.

It can be understood that the antenna phase control device 100 can obtain the current location information of the moving carrier 70. When the current location of the moving carrier 70 is detected as a preset location, the antenna phase control device 100 can adjust the phase of the antenna according to the phase information to adjust the signal radiation direction of the antenna 50 and improve the communication quality between the antenna 50 and the satellite 60.

FIG. 9 is a flowchart of the antenna phase control method in accordance with another embodiment of the present disclosure. The antenna phase control method can be executed by the antenna phase control device 200, and the method includes the following steps:

At step S21, obtaining the initial phase of the antenna.

It can be understood that in the embodiment, step S21 is the same as step S11 in FIG. 8, which will not be repeated here.

At step S22, obtaining the destination information of the moving carrier and generating the navigation information based on the current location information and the destination information of the moving carrier.

It can be understood that in the embodiment, step S22 is the same as step S12 in FIG. 8, which will not be repeated here.

At step S23, calculating the phase information of the antenna and the preset location in the path according to the navigation information.

It can be understood that in the embodiment, step S23 is the same as step S13 in FIG. 8, which will not be repeated here.

At step S24, obtaining the movement information of the moving carrier when the preset conditions are met.

In the embodiment, the current movement information includes the current direction information and the current angle information of the moving carrier 70.

In some embodiments, the antenna phase control device 200 includes an accelerometer, a gyroscope and a magnetometer. The accelerometer is used to measure the current acceleration of the moving carrier 70 (including gravity acceleration), the gyroscope is used to measure the angular velocity and the direction angle of the moving carrier 70, and the magnetometer is used to measure the magnetic field strength and the direction at the location of the moving carrier 70.

In one embodiment, the preset condition includes turning on a turn signal. In another embodiment, the preset condition includes turning on a steering wheel. For example, the preset conditions include turning on a turn signal of the moving carrier 70, steering wheel rotation angle greater than a preset threshold. It can be understood that when the preset conditions are met, the movement direction of the moving carrier 70 changes significantly, so it is necessary to measure accurate movement information to calculate the phase of the antenna 50.

At step S25, controlling the phase of the antenna according to the phase information and the movement information of the antenna when the moving carrier reaches the preset location.

It can be understood that the antenna phase control device 200 can obtain the current location information of the moving carrier 70, when the current location of the moving carrier 70 is detected to be a preset location, the antenna phase control device 200 can adjust the phase of the antenna 50 according to the phase information and the movement information to adjust the signal radiation direction of the antenna 50 and improve the communication quality between the antenna 50 and the satellite 60.

The antenna phase control method and device provided in the present disclosure can calculate the antenna phase based on the navigation information and the movement information, so as to dynamically adjust the radiation direction of the antenna 50.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will, therefore, be appreciated that the exemplary embodiments described above may be modified within the scope of the claims.

What is claimed is:

1. An antenna phase control method applied to an antenna phase control device and an antenna, the antenna phase control device and the antenna disposed on a moving carrier, and the antenna phase control method comprising:
   obtaining a location information of the moving carrier;
      obtaining a destination information of the moving carrier and generating a navigation information according to the location information and the destination information; wherein the navigation information comprises a path from the location information of the moving carrier to the destination information;
      calculating at least one preset location point in the path and a phase information of the antenna corresponding to the at least one preset location point; and
      controlling a phase of the antenna according to the phase information of the antenna corresponding to the at least one preset location point when the moving carrier reaches the at least one preset location point;
      extracting a first location point and a second location point in the path, obtaining a first direction information of the first location point, a second direction information of the second location point, a first slope information of the first location point and a second slope information of the second location point; and
      applying the first location point or the second location point as a preset location if a first variation amount of the first direction information of the first location point compared with the second direction information of the second location point is greater than a first threshold value or a second variation amount of the first slope information of the first location point compared with the second slope information of the second location point is greater than a second threshold value, wherein the first location point is adjacent to the second location point in the path.

2. The antenna phase control method according to claim 1, wherein the navigation information further comprises a direction information of the at least one preset location point.

3. The antenna phase control method according to claim 1, wherein the navigation information further comprises a slope information of the at least one preset location point.

4. The antenna phase control method according to claim 1, further comprising:
   obtaining a movement information of the moving carrier, and controlling the phase of the antenna according to the movement information.

5. The antenna phase control method according to claim 4, wherein the movement information comprises the direction information and an angle information of the moving carrier.

6. The antenna phase control method according to claim 5, further comprising:
   obtaining the movement information of the moving carrier when a preset condition is met, wherein the preset condition comprises turning on a turn signal.

7. The antenna phase control method according to claim 5, further comprising:
   obtaining the movement information of the moving carrier when a preset condition is met, wherein the preset condition comprises turning on a steering wheel.

8. An antenna phase control device and an antenna disposed on a moving carrier, and the antenna phase control device comprising:

a positioning unit configured to obtain a location information of the moving carrier;

a navigation unit electrically connected to the positioning unit and configured to obtain a destination information of the moving carrier and generating a navigation information according to the location information and the destination information; wherein the navigation information comprises a path from the location information of the moving carrier to the destination information;

a calculation unit electrically connected to the navigation unit and configured to calculate at least one preset location point in the path and a phase information of the antenna corresponding to the at least one preset location point; and a control unit electrically connected to the positioning unit, the calculation unit and the antenna, and the control unit configured to obtain the location information, the phase information and the at least one preset location point and configured to control a phase of the antenna according to the phase information of the antenna corresponding to the at least one preset location point when the moving carrier reaches the at least one preset location point;

wherein the calculation unit is further configured to extract a first location point and a second location point in the path and obtain a first direction information of the first location point, a second direction information of the second location point, a first slope information of the first location point and a second slope information of the second location point, the calculation unit is further configured to apply the first location point or the second location point as a preset location if a first variation amount of the first slope information of the first location point compared with the second slope information of the second location point is greater than a first threshold value or a second variation amount of the first slope information of the first location point compared with the second slope information of the second location point is greater than a second threshold value, wherein the first location point is adjacent to the second location point in the path.

9. The antenna phase control device according to claim 8, wherein the navigation information further comprises a direction information of the at least one preset location point.

10. The antenna phase control device according to claim 8, wherein the navigation information further comprises a slope information of the at least one preset location point.

11. The antenna phase control device according to claim 8, further comprising an inertial measuring unit; wherein the inertial measuring unit is configured to obtain a movement information of the moving carrier, the control unit is electrically connected to the inertial measuring unit, and the control unit is configured to control the phase of the antenna according to the movement information.

12. The antenna phase control device according to claim 11, wherein the movement information comprises the direction information and an angle information of the moving carrier.

13. The antenna phase control device according to claim 11, wherein the inertial measuring unit is further configured to obtain the movement information of the moving carrier when a preset condition is met, wherein the preset condition comprises turning on a turn signal.

14. The antenna phase control device according to claim 11, wherein the inertial measuring unit is further configured to obtain the movement information of the moving carrier when a preset condition is met, wherein the preset condition comprises turning on a steering wheel.

* * * * *